United States Patent [19]

Reichard

[11] Patent Number: 5,508,905
[45] Date of Patent: Apr. 16, 1996

[54] LOW DISTORTION VARIABLE OUTPUT POWER SUPPLY

[75] Inventor: Jeffrey A. Reichard, Menomonee Falls, Wis.

[73] Assignee: Metropolitan Pump Company, Romeoville, Ill.

[21] Appl. No.: 392,021

[22] Filed: Feb. 21, 1995

Related U.S. Application Data

[63] Continuation of Ser. No. 926,777, Aug. 6, 1992, abandoned.

[51] Int. Cl.$^6$ .................................................. H02M 7/00
[52] U.S. Cl. ................................................ 363/71; 307/58
[58] Field of Search ................................ 363/71, 72, 55, 363/95, 65; 307/58, 64, 82, 66

[56] References Cited

U.S. PATENT DOCUMENTS

| | | | |
|---|---|---|---|
| 3,750,004 | 7/1973 | Walker | 321/14 |
| 4,063,143 | 12/1977 | Forstbauer | 363/40 |
| 4,453,207 | 6/1984 | Paul | 363/139 |
| 4,692,854 | 9/1987 | Baxter, Jr. et al. | 363/75 |
| 4,698,739 | 10/1987 | Paice | 363/71 |
| 4,717,996 | 1/1988 | Bourke et al. | 363/56 |
| 4,894,764 | 1/1990 | Meyer et al. | 363/65 |
| 4,956,762 | 9/1990 | Loveness et al. | 363/65 |
| 5,001,399 | 3/1991 | Layden | 315/105 |
| 5,239,454 | 8/1993 | Dhyanchand | 363/43 |
| 5,245,525 | 9/1993 | Galloway et al. | 363/71 |
| 5,272,612 | 12/1993 | Harada et al. | 363/8 |
| 5,301,098 | 4/1994 | Dhyanchand et al. | 363/97 |

OTHER PUBLICATIONS

Eder, et al., *Control of the Output Voltage in Rectifiers*, Siemens Zeitschrift, Oct. 1964, No. 10, 775–781 (English Translation Provided).

Heintze, et al., *Pulswechselrichter zur Drehzahlsteuerung von Asynchronmaschinen*, Siemens Zeitschrift, 1971, No. 3, 154–161 (No Translation Provided).

Best Power Technology, Inc. Fall 1991 Catalog, 32 pages.

*Primary Examiner*—Peter S. Wong
*Assistant Examiner*—Adolf Berhane
*Attorney, Agent, or Firm*—Dressler, Goldsmith, Shore & Milnamow, Ltd.

[57] ABSTRACT

An uninterruptable power supply incorporates a plurality of substantially identical inverter modules in combination with a plurality of transformers. Each of the inverter modules is coupled to one coil of a respective transformer. The second coil of the transformers are electrically coupled in series. The inverter modules can be driven by a battery and the switched outputs therefrom, transformer coupled, can be added in the series connected second windings thereby producing alternating output voltages and currents of any desired magnitude. Other output voltage waveshapes are also possible.

8 Claims, 12 Drawing Sheets

$I_{FILTER} = I_{INPUT} - I_{LOAD}$

LOW DISTORTION VARIABLE OUTPUT POWER SUPPLY

This is a continuation of application Ser. No. 07/926,777, filed Aug. 6, 1992, now abandoned.

FIELD OF THE INVENTION

The invention pertains to uninterruptable power supplies. More particularly, the invention pertains to inverter based uninterruptable power supplies which can have multiple modes of operation.

BACKGROUND OF THE INVENTION

Uninterruptable power supplies used to provide a reliable and continuous source of alternating electrical energy to one or more electrical devices, such as pumps or computer systems, have become more and more important as computers, networks, and other devices, whose reliable and continuing performance is required, have spread throughout the industrial world. One known form of uninterruptable power supply utilizes a pair of switching elements in combination with a ferroresonant transformer.

While such products have been successful, they often require a special transformer, which can add substantially to the overall price of the unit. In addition, such devices tend to have a single function. That function is one of providing a source of alternating current electrical energy in response to a failure of utility supplied energy.

There continues to be a need for high performance, low cost, uninterruptable power supplies given the wide range of demands for such service. Preferably, such supplies would be less expensive than known supplies which use custom ferroresonant transformers. Also preferably, it would be desirable to be able to organize such a supply on a modular basis, such that additional power modules could be added to provide differing electrical output characteristics.

It would be desirable to be able to use the same circuitry that generates the output AC to recharge the associated batteries.

SUMMARY OF THE INVENTION

A multiple operating mode power supply includes a plurality of substantially identical waveform generators. The generators each include an output transformer.

The output transformers each include a primary coil and a secondary coil. The primary coils are each coupled to a respective waveform generator. The secondary coils are coupled together and provide either an electrical energy input port or an output port depending on the mode of operation.

One aspect of the invention provides for coupling the secondary coils in series. Alternate arrangements are possible.

Each of the waveform generators includes a plurality of switching elements. The switching elements are arranged as a multi-leg bridge with the respective primary coil coupled between selected legs of the bridge.

Control circuits provide sequential electrical switching signals to the switching elements of each waveform generator to produce a selected mode of operation. The control circuits can be implemented using an array of programmed read-only memory elements or a programmed logic array. Alternately, a microprocessor could be used.

In a first mode of operation, in accordance with the present invention, the supply can function as a DC to AC inverter. In this mode, DC energy, from a battery for example, is transformed into AC-type electrical signals to drive a load normally driven from utility supplied energy.

In another mode of operation, the supply can function as a battery charger to keep the battery fully charged in anticipation of switching into the first mode. By incorporating automatic switching from one mode to another, in yet another aspect of the invention, an uninterruptable power supply is provided.

In another embodiment of the invention, multiple phase AC can be locally generated off of a single-phase line pair. In a further embodiment, line current harmonics can be reduced by coupling an active filter across the AC line pair. In both of the above embodiments, selected switching signals are generated to switch one or more bridge-type waveform generators.

These and other aspects and attributes of the present invention will be discussed with reference to the following drawings and accompanying specification.

DETAILED DESCRIPTION OF THE INVENTION

While this invention is susceptible of embodiment in many different forms, there is shown in the drawing and will be described herein in detail specific embodiments thereof with the understanding that the present disclosure is to be considered as an exemplification of the principles of the invention and is not intended to limit the invention to the specific embodiments illustrated.

Figure 1:
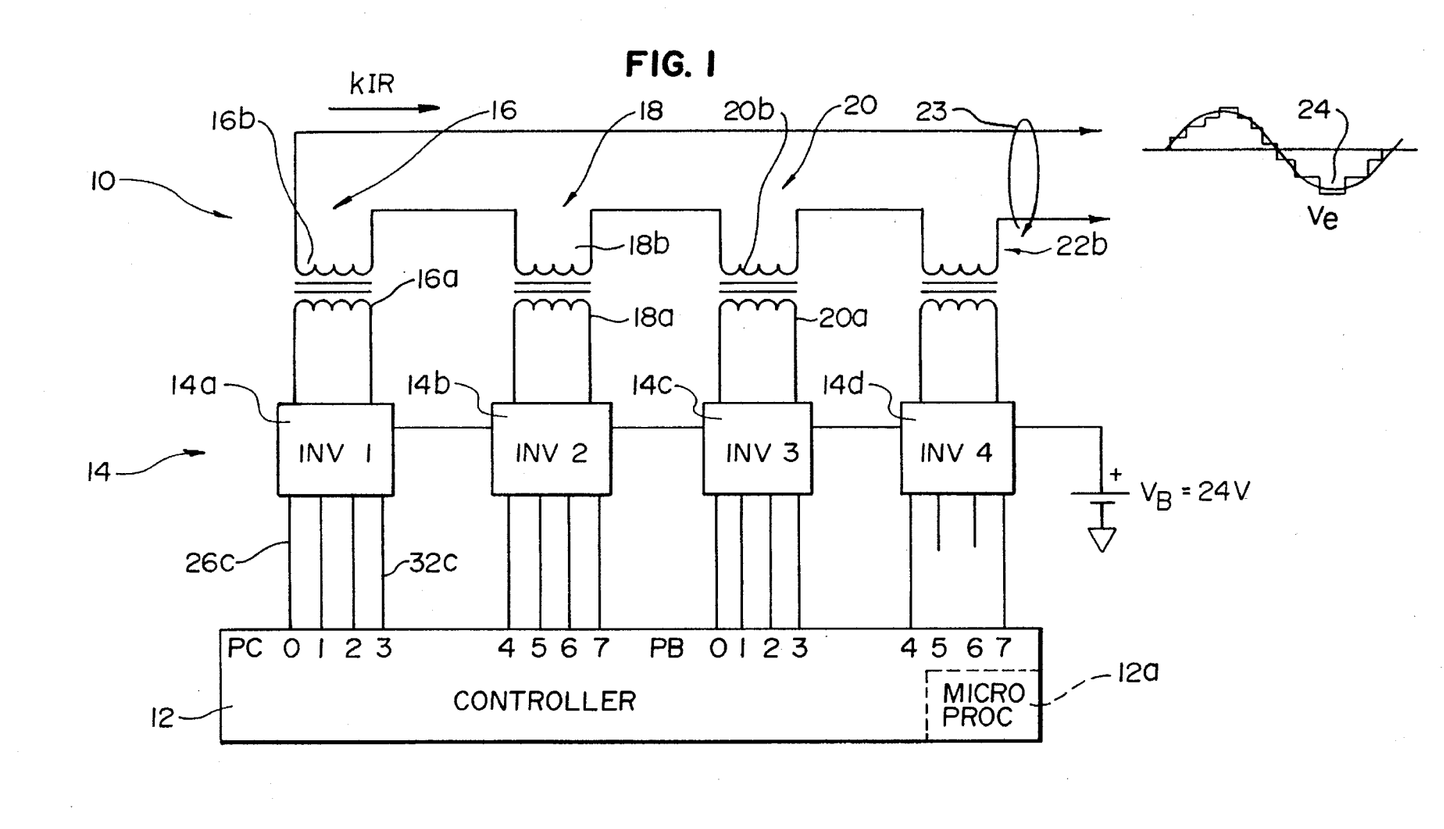
FIG. 1 is an overall schematic of an electrical system having a plurality of substantially identical inverter modules, which embodies the present invention.

FIG. 1 illustrates a schematic diagram of a system 10 which embodies the present invention. The system 10 includes control circuitry 12, which is coupled to a plurality 14 of substantially identical inverter circuits. Each of the members 14a–14d of the plurality 14 is coupled to the controller 12 and receives switching signals therefrom.

The controller 12 can be implemented as a hardwired logic array, a plurality of read-only memories or programmable read-only memories, or a programmable logic array. Alternately, the control circuitry 12 can be implemented using a microprocessor 12a (illustrated in phantom). One usable microprocessor family is the MC68HC11 family marketed by Motorola.

When the system 10 is used as an uninterruptable power supply, each of the inverter circuits 14a–14d produces a generally rectangular electrical signal with a common frequency but varying duty cycles, in response to switching signals received from control circuitry 12. Other modes of operation are discussed subsequently.

Coupled to an output port of each of the members of the plurality 14 is a transformer, such as transformers 16, 18, 20, and 22. Each of the transformers has a first coil, such as a coil 20a, which could be a primary coil, and a second coil, such as a coil 20b, which could be a secondary coil.

Each of the coils 16b, 18b, 20b, 22b is coupled in series to an electrical port 23. Depending on the mode of operation of the power supply 10, the port 23 can be an electrical output port whereat an approximation to a sine wave 24 is generated for purposes of driving a load. Alternately, in another mode, the port 23 can be an AC input electrical port for the purpose of charging a battery, such as the battery $V_b$.

The circuitry 10 has substantial advantages when operated in a mode to generate sinusoidal-like output waveforms, such as the waveform 24, generally to provide uninterrupted AC-type electrical power to a load. If the basic frequency of the waveforms generated by the inverter circuits 14a–14d is on the order of 60 Hz., the composite output electrical signal 24 will also have a basic frequency on the order of 60 Hz. By adding together multiple relatively low-frequency waveforms, the output waveform 24 can be generated with relatively low distortion.

This low distortion result is accomplished by avoiding high-frequency operation of the inverter circuitry which adds to switching losses and also requires higher performance driver circuitry. In addition, such power supplies require large output filters to suppress unwanted high frequency characteristic signals. These filters add expense, increase power dissipation, and can contribute to resonance problems of the supply.

In contradistinction, the inverter modules, such as the inverters 14a–14d of the supply 10, exhibit relatively low power dissipation and relatively simple control elements, such as the control 12, since each of the inverter blocks operates only at the fundamental output frequency. No output filter is needed. Another advantage is an ability to generate relatively high output current without directly paralleling semiconductors.

Additional inverter modules can be added to the supply 10 in parallel, which then would be coupled to the port 23 via associated transformers. The characteristics of the output waveform 24 can be altered by changing of the switching signal characteristics generated by the controller 12. Since the secondary or output currents are essentially sinusoidal corresponding to signal 24, there are relatively low losses in the transformers 16, 18, and 20.

Further, mode changing can be readily implemented by altering control patterns generated by control circuit 12. Hence, in one mode, the power supply 10 can be operated to generate emergency or backup AC output from the battery $V_b$. In another mode, also generated by the control bits from the control circuitry 12, input sinusoidal electrical energy, input via the port 23, can be used to recharge the battery $V_b$. Other than altering the switching signal bit patterns generated by the control circuitry 12, the apparatus 10 utilizes the same circuitry for both modes.

It will also be understood that the transformers, such transformers 16–22, can be standard, substantially identical, separate transformers. Alternately, if desired, weighted turns ratios can be used among the various transformers so as to reduce output distortion in the output signal 24.

Finally, if desired, for products where a fixed basic number of inverter circuits is to be supplied with the basic product, a custom transformer can be used to improve overall power supply performance. The custom transformer can in turn, be coupled to additional discreet transformers if the number of inverters in a given unit is to be increased.

If, in the system 10, the transformers 16–22 have equal transformer weightings, the output steps for the waveform 24 will be as in Table 1.

TABLE 1

| |
|---|
| 0 Volts |
| $\pm \dfrac{V_p}{4}$ Volts |
| $\pm \dfrac{V_p}{2}$ Volts |
| $\pm \dfrac{3V_p}{4}$ Volts |
| $\pm V_p$ Volts |

Figure 2:
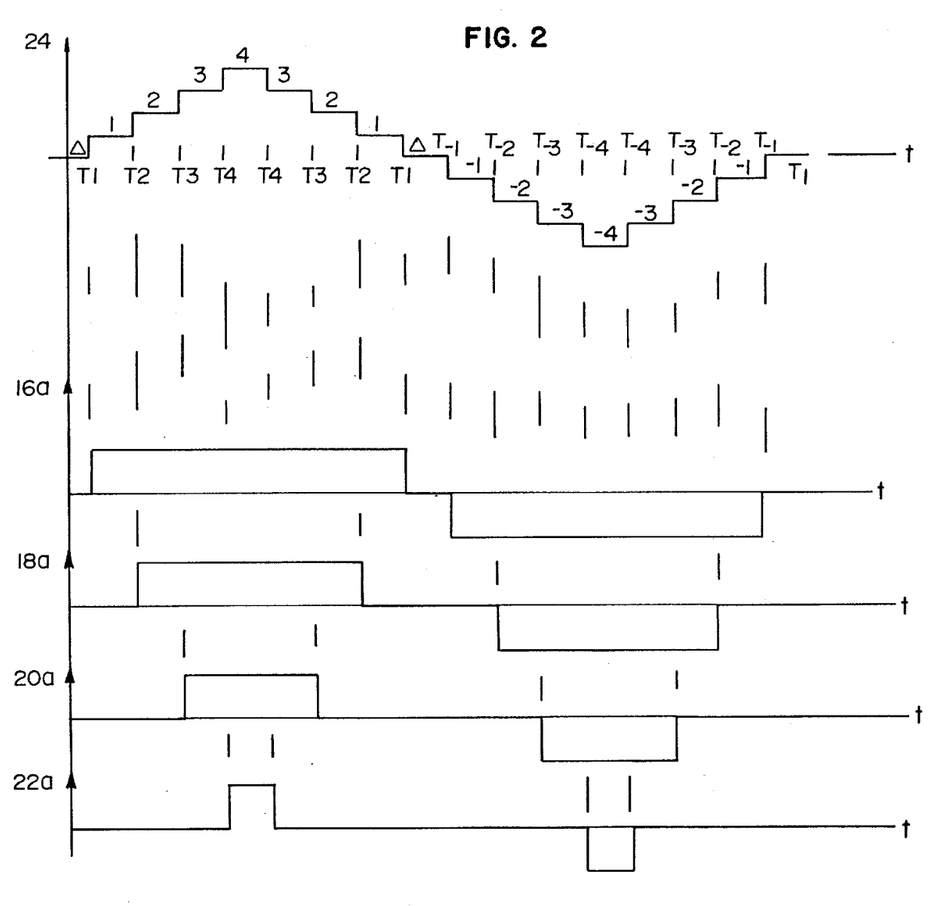
FIG. 2 is a plurality of timing diagrams illustrating operation of the system of FIG. 1.

FIG. 2 illustrates the output waveforms for each of the inverters 14a–14d when driven by a control unit, such as processor 12a, to generate a substantially sinusoidal output waveform 24 at the port 23. As illustrated in FIG. 2, each of the waveforms generated by the inverters 14a–14d exhibits the same frequency as the output waveform 24. However, the respective duty cycles differ.

Figure 3:
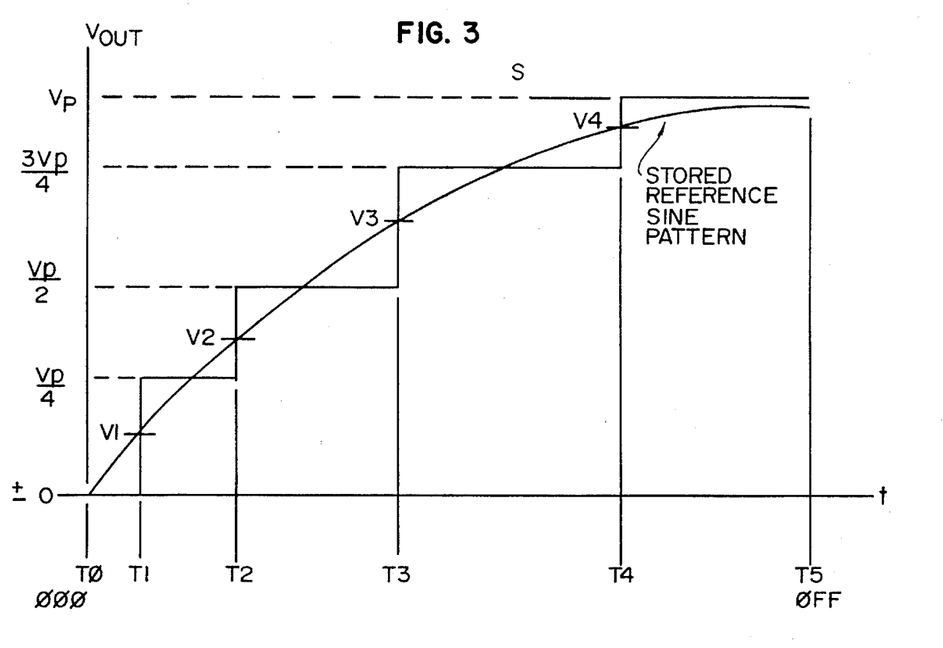
FIG. 3 is a graph of a quarter cycle of a selected output waveform as generated by the system of FIG. 1.

With respect to FIG. 2, the times identified therein T+0, T1, . . . T4 all relate to values of a prestored quarter cycle of a reference sine waveform S being approximated by the output waveform 46, as illustrated in FIG. 3. The values V1–V4 can be used to determine the values of T1–T5 as follows:

$$T1 = \frac{1}{2} * (1.75 * (V_B) - I_{FBKC} * I_R) = V1$$

$$T2 = 1\frac{1}{2} * ((1.75 * V_B) - I_{FBKC} * I_R) = V2$$

$$T3 = 2\frac{1}{2} * ((1.75 * V_B) - I_{FBKC} * I_R) = V3$$

$$T4 = 3\frac{1}{2} * ((1.75 * V_B) - I_{FBKC} * I_R) = V4$$

$$\frac{1}{4 * (T5 - T0)} = 60 \text{ Hz for 60 hz output}$$

$$= (50 \text{ Hz for 50 Hz output})$$

In the above equations, as the battery voltage $V_B$ varies, the transition times T1–T4 also vary. In addition, the measured feedback current, best seen in FIG. 3, and the load current, $I_R$, also affect those transition times.

The time T+0 refers to a first condition where zero volts are being output by the inverters 14a–14d. The time T-0 refers to a second condition, discussed subsequently, where zero volts are being output by the same set of inverters.

Table 2, middle column, illustrates an input hexadecimal control code sequence for the inverters 14a–14d, for generating one cycle of the waveform 24. A binary "0" indicates that a switching element of the respective inverter has been turned on. The pulse width identifiers, left-most column of Table 2, refer to output pulse widths as indicated in FIG. 2. The right most column of Table 2 specifies pulse duration in terms of switching times.

TABLE 2

| WIDTH IDENTIFIERS | PROCESSOR 12a OUTPUT DRIVE SIGNALS | | Pulse Duration | |
|---|---|---|---|---|
| | PC0-7 | PB0-7 | | |
| 4 | 33 | 33 | ¼ CYCLE | (T5–T4) |
| 3 | 53 | 33 | | (T4–T3) |
| 2 | 55 | 33 | | (T3–T2) |
| 1 | 55 | 53 | | (T2–T1) |
| Δ | 55 | 55 | | (T1–T0) |
| Δ | 55 | 55 | ¼ CYCLE | (T1–T0) |
| −1 | 55 | 5C | | (T2–T1) |
| −2 | 55 | CC | | (T3–T2) |
| −3 | 5C | CC | | (T4–T3) |
| −4 | CC | CC | | (T5–T4) |
| −4 | CC | CC | ¼ CYCLE | (T5–T4) |
| −3 | CC | CC | | (T4–T3) |
| −2 | AC | CC | | (T3–T2) |
| −1 | AA | CC | | (T2–T1) |
| −Δ | AA | AA | | (T1–T0) |
| −Δ | AA | AA | ¼ CYCLE | (T1–T0) |
| 1 | AA | A3 | | (T2–T1) |
| 2 | AA | 33 | | (T3–T2) |
| 3 | A3 | 33 | | (T4–T3) |
| 4 | 33 | 33 | | (T5–T4) |

Figure 4:
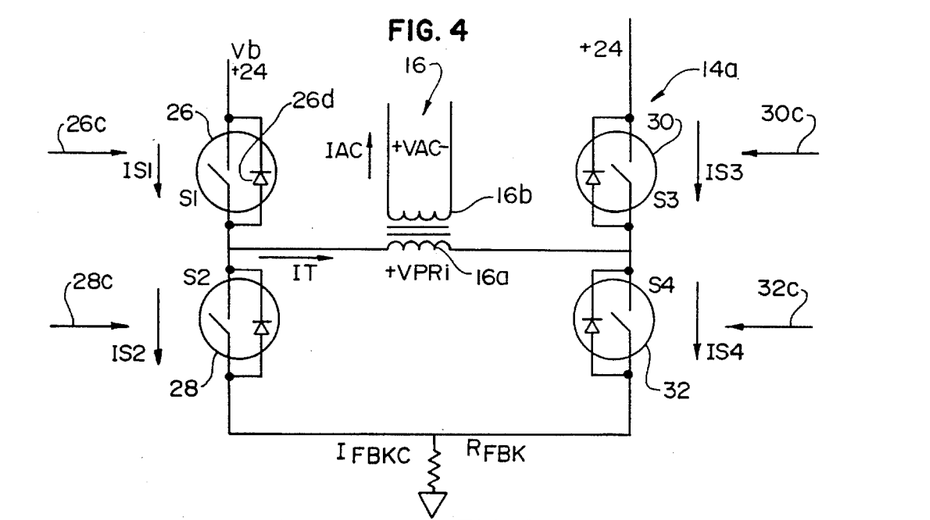
FIG. 4 is a schematic diagram of a typical inverter module usable with the system of FIG. 1.

FIG. 4 is a representative schematic of one of the inverter modules, inverter module 14a. Only one of the inverter modules need be discussed since all of the inverter modules 14a–14d are the same.

Each of the inverter circuits includes four FET switches, corresponding to switches 26–32 of FIG. 4. Each of the switches 26–32 has a corresponding conventional schematic 34 as illustrated in FIG. 5.

Figure 5:
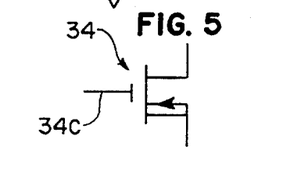
FIG. 5 is a schematic symbol representing one of the switching elements of the inverter circuit of FIG. 4.

A gate or control input, 26c, 28c, 30c and 32c illustrated schematically in FIG. 4, corresponds to a gate input 34c of FIG. 5. Semiconductor switches of a type illustrated in FIGS. 4 and 5 are commercially available as FET's, Bipolar Transistors, IGBT's, GTO's, SCR's, or MCT's.

Depending on the control voltages applied to the inputs 26c–32c from the control circuitry 12, each of the switches 26–32 in each of the inverters can be turned on and off as a function of time. The semiconductor switches 26–32 can conduct current therethrough, such as $I_{s1}$ in both positive and negative directions.

Current $I_{s1}$ can flow through the switch 26 in the indicated positive direction when the switch is closed by an applied gate control voltage 26c. Negative current $I_{s1}$ can flow through the switch 26, whether or not the switch is closed, as a result of the internal diode 26d therein.

Each of the control lines $26_c$–$32_c$ is coupled to a respective one of the output drive lines, such as PC0–PC3, PC4–PC7, PB0–PB3, or PB4–PB7 of the control circuitry 12. As noted above, the representative bit patterns generated by control circuit 12 for the control lines $26_c$–$32_c$ are illustrated in Table 2.

As illustrated in FIG. 4, the corresponding transformer, such as the transformer 16, is coupled between legs of a bridge formed by the four switches 26–32. Hence, bidirectional current $I_T$ can flow in the coil 16a of the transformer 16, depending on the switching bit pattern presented by control element 12 to the switches 26–32. The bidirectional current $I_T$ and related voltage developed across the coil 16a can in turn induce an output voltage $V_{AC}$ in the second coil 16b as is conventional in a transformer.

The turns ratio between the primary coil 16a and the secondary coil 16b for the following discussion corresponds to N. Alternately, an input voltage, applied via the coil 16b, can be converted into unipolar voltage and current if desired for purposes of charging the battery $V_b$ based on the plurality of switching signals applied on the lines 26c–32c of the controller 12.

Figure 6:
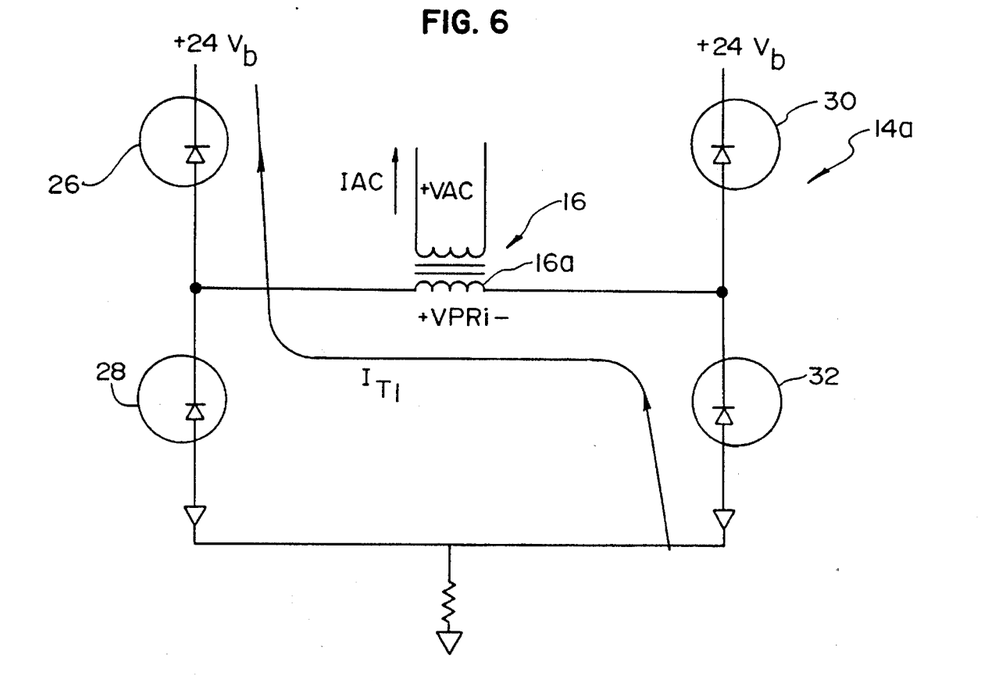
FIG. 6 is a schematic diagram of one of the inverter modules from the system of FIG. 1 illustrating current flow in a first direction during a battery charging mode of operation.

By way of further illustration of the various modes of operation of the system 10, FIG. 6 illustrates how an inverter, such as the inverter 14a, can be used to charge the battery $V_b$. In this mode, an AC voltage $V_{AC}$ is applied to the transformer 16 via the input/output port 23.

Figure 7:
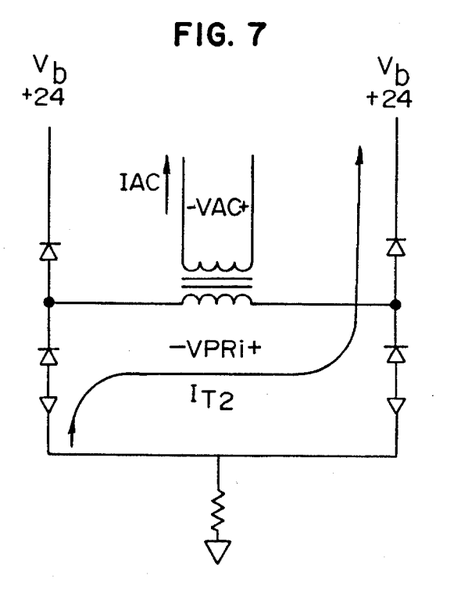
FIG. 7 is a schematic diagram of one of the inverter modules from the system of FIG. 1 illustrating current flow in a second direction during a battery charging mode of operation.

As noted previously, the turns ratio between the primary coil 16a and the secondary coil 16b corresponds to N. If the applied voltage $V_{AC}$ is positive, a primary voltage $V_{PRI}$ will be induced in the primary coil 16a with the polarity as indicated. As a result of the induced voltage in the primary coil 16a, a current $-I_{T1}$ will flow through the diodes in the switches 26 and 32 thereby charging the battery $V_b$. Alternately, if the applied voltage $V_{AC}$ is negative, as illustrated in FIG. 7, the induced voltage $V_{PRI}$ will cause a current $I_{T2}$ to flow in the indicated direction thereupon also charging the battery $V_b$.

During the time intervals where the instantaneous value of the applied voltage divided by the turns ratio N is less than 24 (the battery voltage $V_b$), all diodes will be reverse biased and no current will flow. Hence, application of a varying AC voltage $V_{AC}$ to the secondary coils, such as the secondary coil 16b, of the transformers provide a vehicle whereby the associated battery can be continuously recharged.

Figure 8:
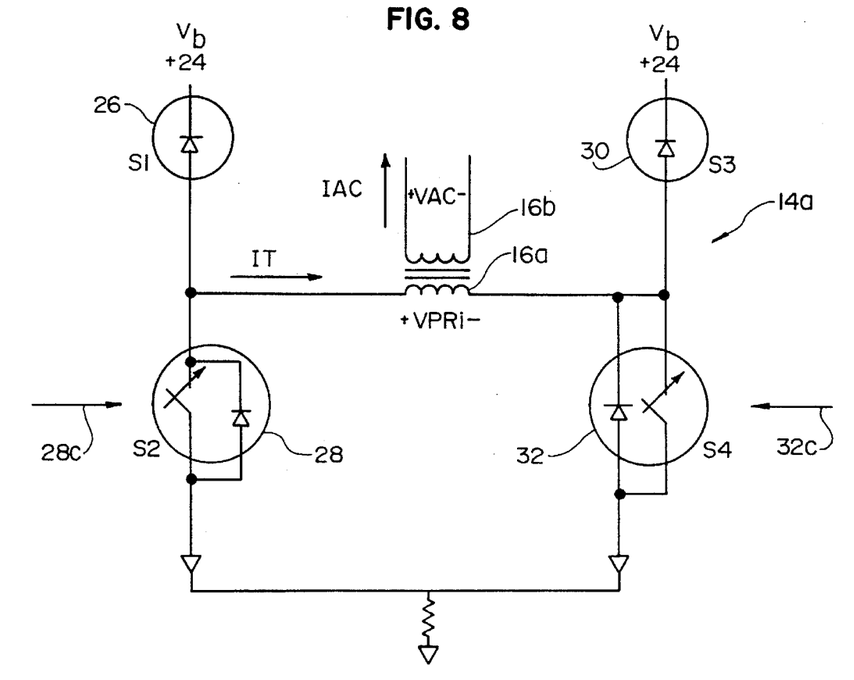
FIG. 8 illustrates a schematic of a typical inverter module with two of the switches closed resulting in a zero output voltage.

FIG. 8 illustrates the inverter 14a in a mode wherein both switch 28 and switch 32 are closed with switches 26 and 30 open. In this instance, current $I_T$ is conducted in both directions through the primary coil 16a. However, the voltage across the primary coil 16a is substantially equal to zero as is the voltage $V_{AC}$ across the secondary coil 16b. A similar condition exists wherein switches 26 and 30 are closed and switches 28 and 32 are open.

Figure 9:
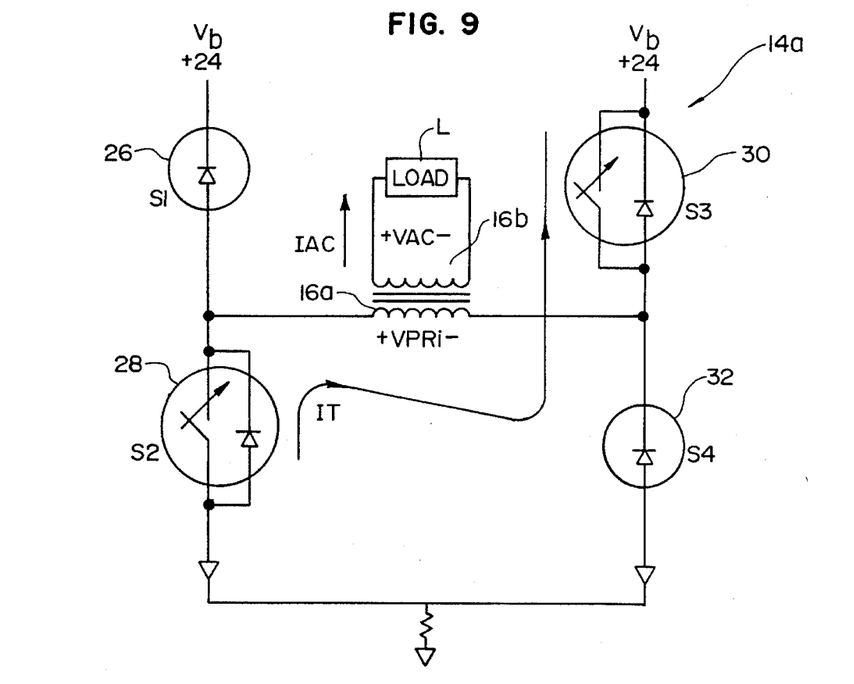
FIG. 9 illustrates a typical inverter circuit with two of the switches closed for purposes of supplying power to or receiving power from a load during a first time interval.
Figure 10:
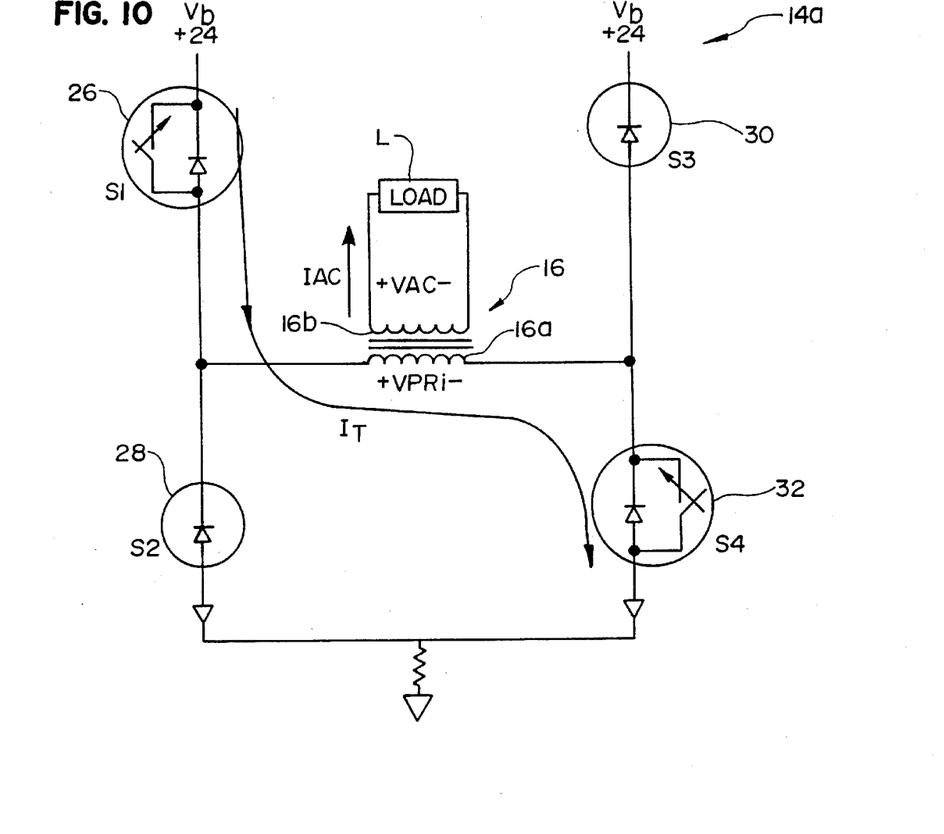
FIG. 10 illustrates a typical inverter circuit with two of the switches closed for purposes of supplying power to or receiving power from a load during a second time interval.

FIGS. 9 and 10 taken together, illustrate current flow $I_T$ in the inverter module 14a with the DC voltage $V_b$ being converted to a switched alternating current and voltage, such as illustrated by composite signal 24, for the purpose of driving a load L. As illustrated in FIG. 9, with switches 28 and 30 conducting and switches 26 and 32 turned off, current $I_T$ flows through the primary coil 16a thereby establishing a voltage $V_{PRI}$ therein with the indicated plurality. An induced voltage $V_{AC}$ is then generated in the secondary 16b. A current $I_{AC}$ then flows in the secondary circuit into the load L.

In this instance, since a current $-I_T$ flows due to the pluralities illustrated in FIG. 9:

$$V_{AC} = -N*V_b$$

Because each of the switches 26–32 includes a diode as illustrated, current $I_T$ will flow in both directions through the switches 28 and 30. In addition:

$$I_T = I_{AC}*N$$

Since current can flow in both directions between switches 28 and 30, if the magnitude of voltage across the primary coil 16a exceeds the magnitude of the voltage present across the secondary coil 16b, then the inverter 14a can supply power to the load L. Conversely, if the magnitude of the voltage across the primary coil 16a is less than the magnitude of the ratio $V_{AC}/N$, then the load L can regenerate electrical energy into the inverter and during this time period recharge the battery $V_b$.

Thus, the inverters 14a–14d are capable of supplying electrical energy to the load L through a portion of the period of the output waveform and receiving electrical energy from the load L through another portion of the period.

FIG. 10 illustrates the inverter 14a of FIG. 9 with the switch elements 26 and 32 closed and the switch elements 28 and 30 open. Hence, by switching elements 28 and 30 to a non-conducting condition alternately with switching elements 26 and 32 to a non-conducting condition, electrical energy can be continuously supplied to, or received from, the load L by the inverter circuitry 14a. Because of the characteristics of the inverter module 14a, the load L can be another AC line, a resistive load, an inductive load, such as a motor, or a capacitative load.

In FIGS. 9 and 10, the primary voltage $V_{PRI}$ can be reduced to zero by simultaneously turning on switches 28 and 32. This is the A pulse interval of FIG. 2. Alternately, $V_{PRI}$ can be reduced to zero by simultaneously turning on switches 26 and 30. This is the $-\Delta$ pulse interval of FIG. 2. Having two zero conditions is advantageous in that it reduces the duty cycle requirements in the various switching elements.

Since each of the inverter modules 14a–14d incorporates a transformer into the output stage, the load L or the source being applied to the port 22 must be AC in nature. It need not necessarily be a sine wave. However, signals having long term DC components are to be avoided as they increase transformer losses.

Figure 11:
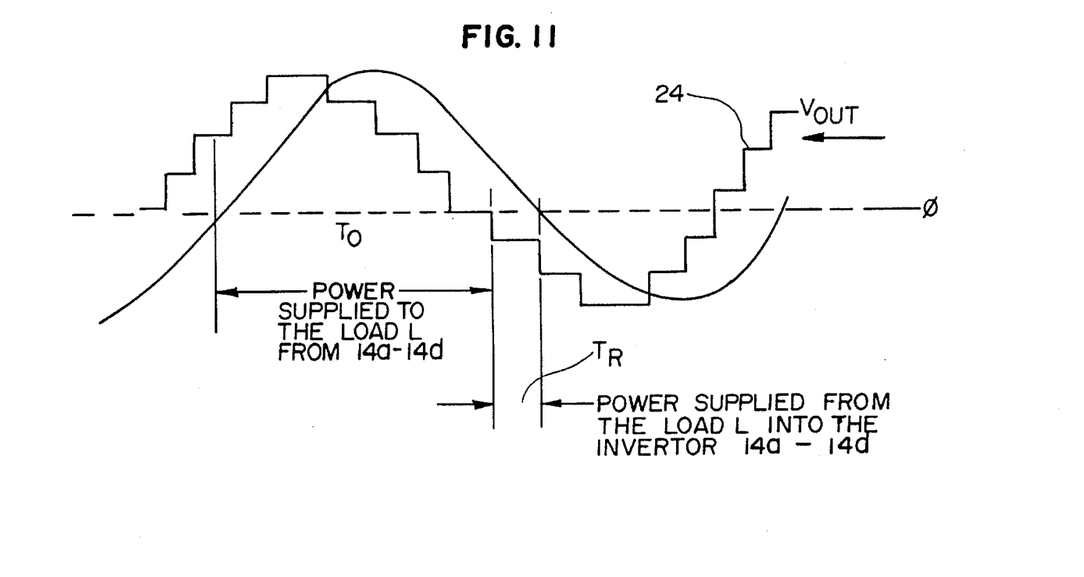
FIG. 11 is a graph illustrating power being supplied to a load L or received from the load by the system of FIG. 1.

FIG. 11 illustrates a graph with an inductive load L, such as a motor, coupled to the system 10. During a first time interval $T_0$, power is supplied by the system 10 to the load L. During a second time interval $T_R$, power is returned from the load L to the power supply 10 into each of the inverter modules 14a–d.

Figure 12:
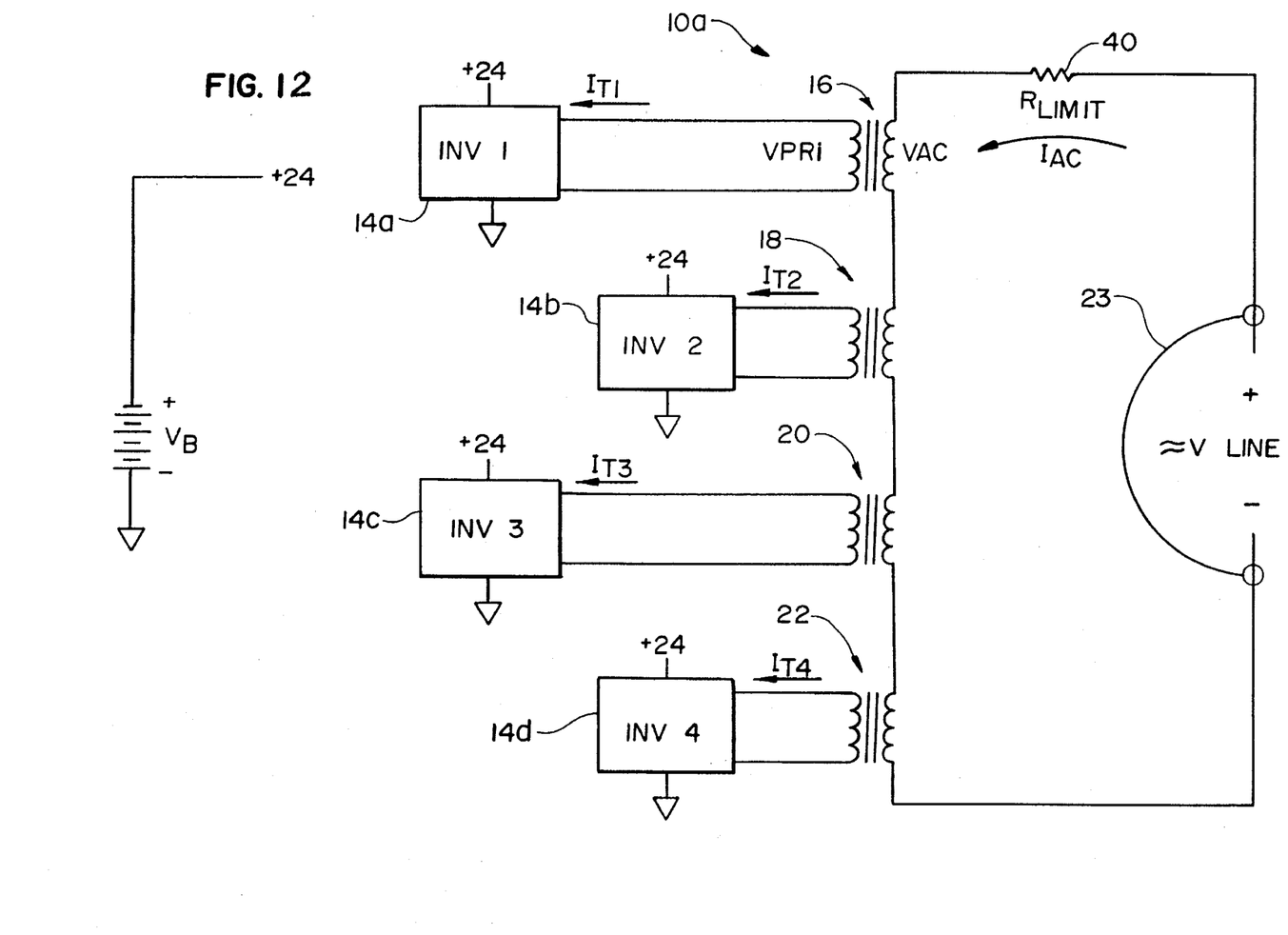
FIG. 12 is a schematic diagram illustrating a system incorporating four inverter modules and being used to charge a battery.

FIG. 12 illustrates the power supply 10a when operating in the battery charging mode. The supply 10a incorporates four inverter modules 14a–14d only for exemplary purposes. More (or fewer) modules could be used, if desired.

A limiting resistor 40 is provided between the AC input port 22 and the transformers 16–23. When operating the supply 10a, to charge the battery $V_B$, several different operating conditions are possible as explained below.

1) All inverters in mode $\phi$ as illustrated in FIG. 6.

A) If $|4 * V_B * N| > |V \text{ Line}|$
   Then: $I_{AC} = 0$ and the changing current $I_C = 0$ B) If $|4 * V_B * n| < |V \text{ Line}|$
   Then: $|I_{AC}| = \dfrac{|V \text{ Line}| - |4 * N * V_B|}{R \text{ Limit}}$ And $I_C = 4 * N * I_{AC}$ 2) If inverter module 14a is operated in Mode 1, as in FIG. 8 with all other inverter modules in mode $\phi$:

A) If $|3 * V_B * N| > |V \text{ Line}|$
   Then: $I_{AC} = 0$ and $I_C = 0$

B) If $|3 * V_B * N| < |V \text{ Line}|$
   Then: $|I_{AC}| = \dfrac{|V \text{ Line}| - |3 * N * V_B|}{R \text{ Limit}}$ and $I_C = 3 * N * I_{AC}$ Condition #2 is used if the system 10a is initially being operated as in Condition #1 above with $$|4*V_b*N| > |V \text{ Line}| \text{ and}$$

charging current is still desired.

With X inverter modules, up to X-1 modules can be switched to Mode 1 to maintain charging current as the battery voltage rises. For zero charging current, either all inverter modules can be switched to Mode 1 or to Mode $\phi$ $$\text{if } |4*V_B*N| > |V \text{ Line}|.$$

The numeral 4 above corresponds to the number of inverter modules.

In a synchronous charging mode, the inverters 14a–14d can remain running in parallel with the AC line. The charge current can be controlled by the inverter switching points. This is feasible since the inverters are operating and very fast transfer precise timing control is possible.

Figure 13A:
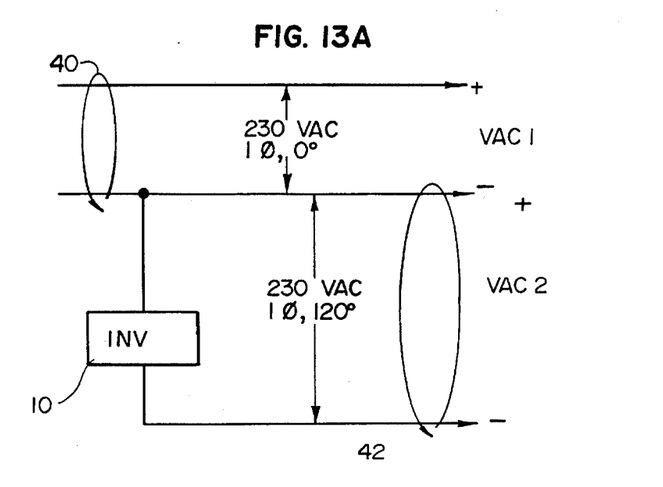
FIG. 13A is a schematic illustrating use of the system of FIG. 1 to produce three phase alternating current from single phase.
Figure 13B:
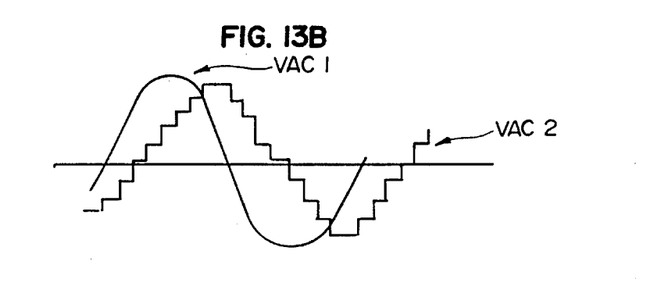
FIG. 13B is a graph illustrating electrical output from the circuit of FIG. 13A.

The supply 10 can also be used to generate an additional AC output phase from a single phase input as illustrated in FIGS. 13A and 13B. By coupling the supply 10 to one side of the available AC line pair 40, a second output phase $V_{AC2}$ can be generated on the line pair 42.

Using the resultant combination of three lines, three phase equipment can be operated off of a single phase input AC line pair. Phase voltages $V_{AC2}$ and $-(V_{AC1}+V_{AC2})$ have been created using the system 10.

Figure 14:
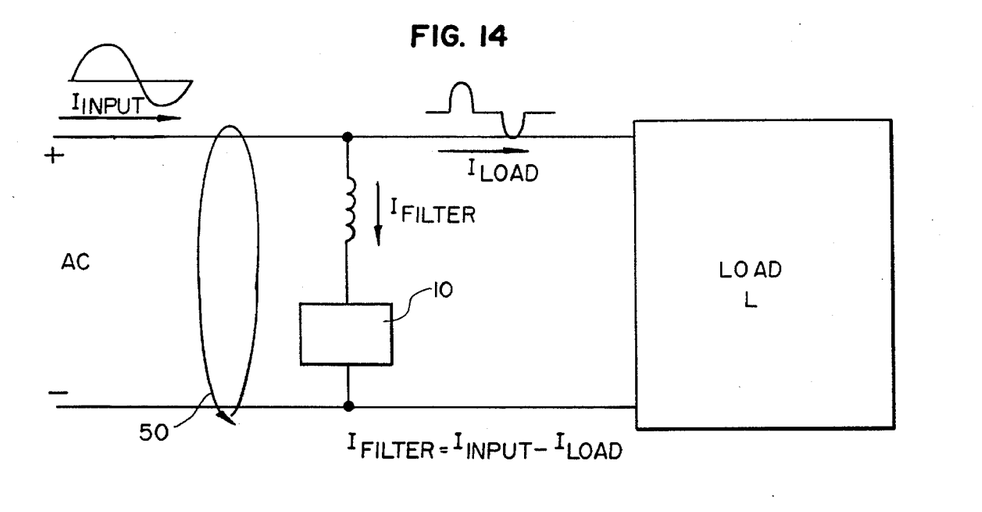
FIG. 14 illustrates a schematic of the system of FIG. 1 used to implement an active line filter.

Further, as illustrated in FIG. 14, the supply 10 can be incorporated into an existing AC circuit, across an AC line pair 50 as an active line filter for the purpose of shaping the composite characteristic of the load L to provide minimal expense operating condition with respect to the AC line pair 50. By altering the switching characteristics output by the control circuitry 12 on lines such as the lines 26c–32c to the associated inverter modules, such as the module 14a, the composite characteristic of the load L in combination with the supply 10 can be used to reduce line current harmonics in the line pair 50. With respect to FIG. 14:

*I Filter=I Input–I Load*

I Filter Avg.=0 and I Filter*$V_{AC}$=0

As a result, no real average power is drawn by the system 10. Inverter output voltage state is selected to force the desired current draw. As a result, line harmonic current draw is near 0% distortion.

If the windings of the transformers, such as the transformers 16–22, are weighted using a 1, 2, 4, 8 weighting code, the switching values for the output waveforms will be:

TABLE 3

0 Volts $\pm \frac{V_p}{16}$ Volts $\pm \frac{V_p}{8}$ Volts $\pm \frac{3V_p}{16}$ Volts $\pm \frac{V_p}{4}$ Volts $\pm \frac{5V_p}{16}$ Volts $\pm \frac{3V_p}{8}$ Volts $\pm \frac{7V_p}{16}$ Volts $\pm \frac{V_p}{2}$ Volts $\pm \frac{9V_p}{16}$ Volts $\pm \frac{5V_p}{8}$ Volts $\pm \frac{11V_p}{16}$ Volts $\pm \frac{3V_p}{4}$ Volts $\pm \frac{13V_p}{16}$ Volts $\pm \frac{7V_p}{8}$ Volts $\pm \frac{15V_p}{16}$ Volts In this configuration, the operating frequency of each of the inverters 14a–14d varies and is equal to:

$$F_0 * \frac{1}{\text{relative turns ratio}}$$

(i.e. weight of ⅛ or ratio of ⅛ main transformer. $F_\phi$ is the fundamental frequency, 50 or 60 Hz.

Figure 15A:
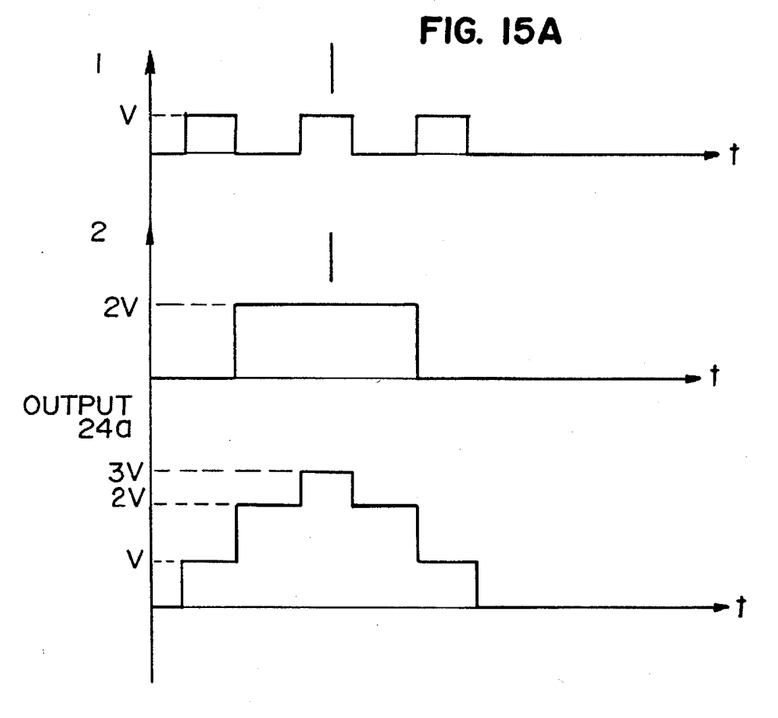
FIG. 15A is a block diagram of an alternate embodiment of the present invention.
Figure 15B:
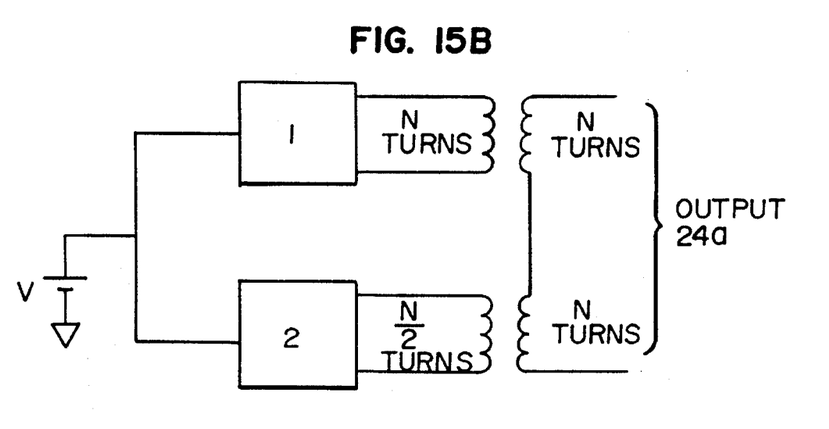
FIG. 15B is a set of timing diagrams illustrating operation of the system of FIG. 15A.

FIG. 15A illustrates an output waveform 24a generated using weighted waveforms for a two inverter example, illustrated in FIG. 15B, with a 2:1 weighted turns ratio. A four inverter weighted system would produce output voltage steps as in Table 3.

Figure 16:
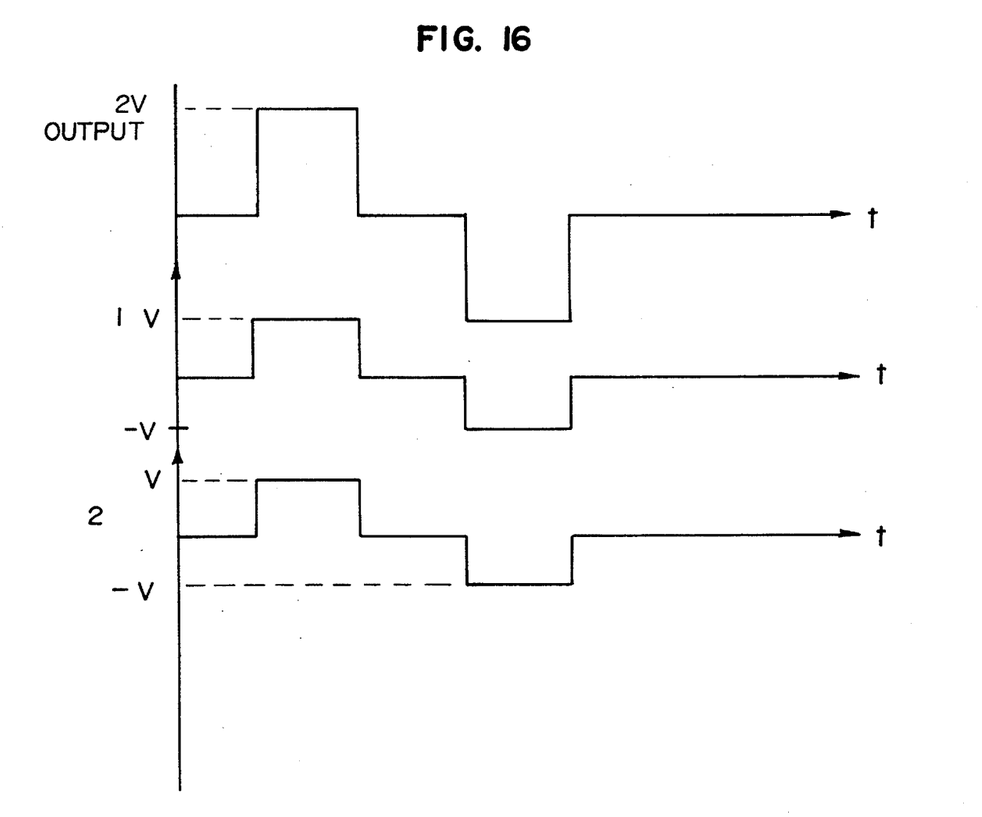
FIG. 16 is a set of timing diagrams illustrating a non-sinusoidal output signal from the system of FIG. 1.

Alternately, non-sinusoidal type waveforms can be generated using the system 10. For example, FIG. 16 illustrates the system 10 operated with two inverters to generate an output sequence wave 24b. Since the system 10 uses a transformer to combine waveforms, a symmetrical output is preferable to minimize transformer losses due to a DC component. The invention is not limited to symmetrical waveforms, however.

Figures 17, 17A:
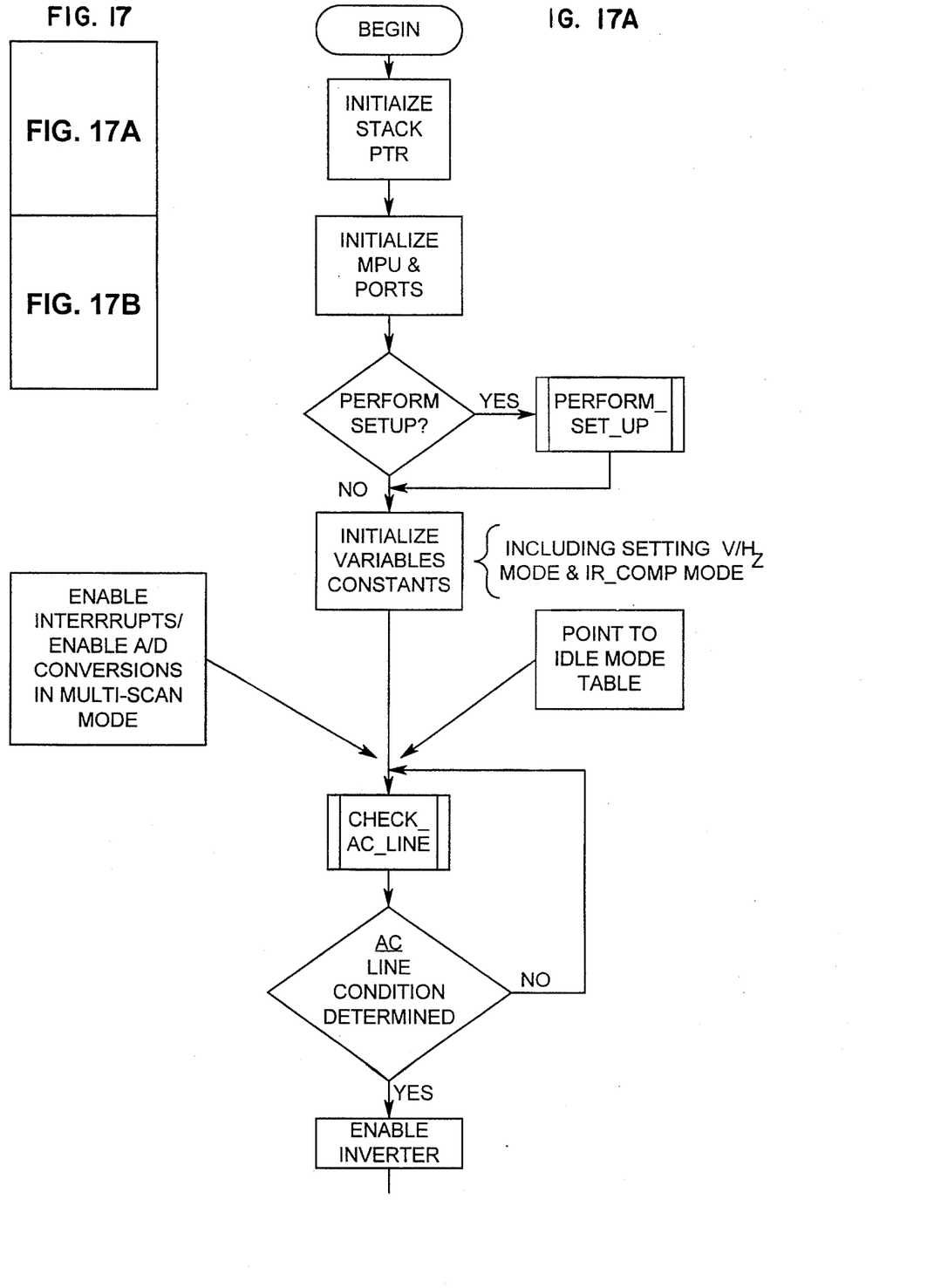
FIG. 17 is a flow diagram of a method of operating the system of FIG. 1.
Figure 17B:
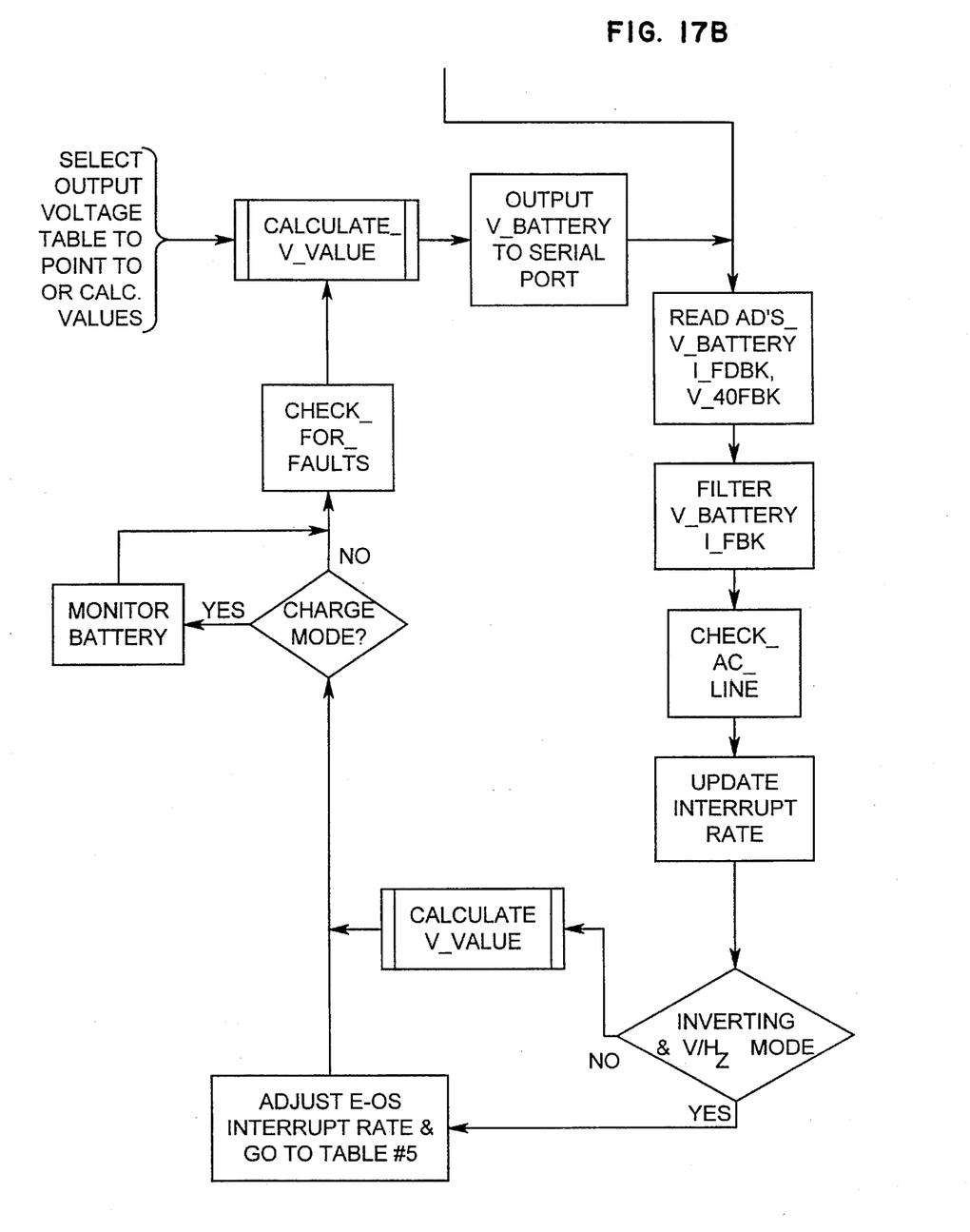

FIG. 17 is a flow diagram illustrating a method of operating the system of FIG. 1.

In accordance with the preceding explanation, the present invention should be interpreted broadly in accordance with the following claims, only, and not solely in accordance with that particular embodiment in which the invention has been taught.

What is claimed is:

1. An apparatus for generating at least single phase AC of a selected output frequency from a battery comprising:
    a control element;
    a plurality of bidirectional, bridge-type inverters coupled to said control element wherein said inverters include first and second nodes;
    a plurality of transformers wherein one of said transformers is associated with respective first and second nodes of each said inverter and is coupled thereto by a first coil and wherein said transformers each include a second coil with said second coils series coupled to one another and wherein said control element switches said inverters such that each said inverter generates at a said respective first coil a varying output signal with a frequency which is substantially the same as said selected output frequency.

2. An apparatus as in claim 1 wherein each said transformer has an associated turns ratio and wherein said turns ratios are the same.

3. An uninterruptable power supply for providing AC-type electrical energy of a selected frequency from a rechargeable DC source when in a first mode and for reversibly supplying DC-type energy to recharge the source when in a second mode, the supply comprising:
    a programmable control element including circuitry for switching from the first mode to the second mode;
    an input/output terminal;
    a plurality of bidirectional inverter circuits, coupled to said control element, for converting applied, unipolar DC-type electrical energy to bi-polar, AC-type electrical energy when in said first mode wherein said inverter circuits, in response to said control element, each produce an electrical output signal having a common, selected frequency, and for converting applied AC-type energy to unipolar energy for recharging the DC source when in said second mode;
    a plurality of primary coils and a plurality of secondary coils coupled to said primary coils wherein each of said inverters has a respective primary coil coupled thereto and said secondary coils are series coupled to one another wherein one of said secondary coils is coupled to said input/output terminal and wherein AC-type energy at the common selected frequency is output at said terminal when in said first mode and AC-type energy is input at said terminal when in said second mode.

4. A method of generating a periodic output waveform having a selected frequency comprising:
    providing a plurality of substantially identical, inverters;
    setting an output frequency of each member of said plurality of inverters to a selected common frequency;
    providing a plurality of transformers;
    coupling the inverters together by coupling a respective transformer with each member of said plurality of inverters and linking the coupled transformers in series; and
    energizing each of said inverters so as to generate an output signal at each, at the selected common frequency, wherein at least some of said output signals are different from others; and combining the output signals using the transformers to produce a periodic output waveform at the selected common frequency.

5. A method as in claim 4 wherein at least some of the output signals have duty cycles which are different from other output signals.

6. A method as in claim 4 which includes an alternate, battery charging mode of operation, wherein the alternate mode of operation includes:

terminating the step of generating the output signal at each member of the plurality of inverters;

applying a varying bipolar periodic input waveform to the transformers;

energizing at least one of the inverters so as to convert at least a portion of the varying input signal to a substantially constant unipolar output electrical signal.

7. An apparatus for generating an AC-type output voltage from a unipolar voltage source comprising:

first and second output terminals;

at least two transformers wherein each transformer has a primary coil and a secondary coil, wherein said secondary coils are coupled in series with one another and to said terminals thereby forming a transformer coupled output circuit between one of said terminals, said series coupled secondary coils and said other terminal;

at least two inverter modules wherein said modules each have a unipolar voltage input terminal, first and second varying voltage output terminals and at least one control input terminal wherein said voltage output terminals of each inverter module are coupled to a respective transformer primary coil whereby all of said inverter modules are transformer coupled to said output circuit;

a control element coupled to said control inputs of all of said inverter modules wherein said control element switches said inverter modules so as to convert an applied unipolar voltage to a varying output voltage at each said respective primary coil, wherein all of said varying output voltages have a common frequency and wherein only said varying output voltages are combined in said transformer coupled output circuit to form at said terminals an AC-type output voltage having the common frequency.

8. An apparatus as in claim 7 wherein said varying output voltages have a common phase and wherein said AC-type output voltage exhibits said common phase.

* * * * *